Nov. 8, 1932.  E. J. SCHECKEL  1,886,839
PADDED LINK FOR ENDLESS TRACTOR CHAINS
Filed Feb. 26, 1930  2 Sheets-Sheet 1
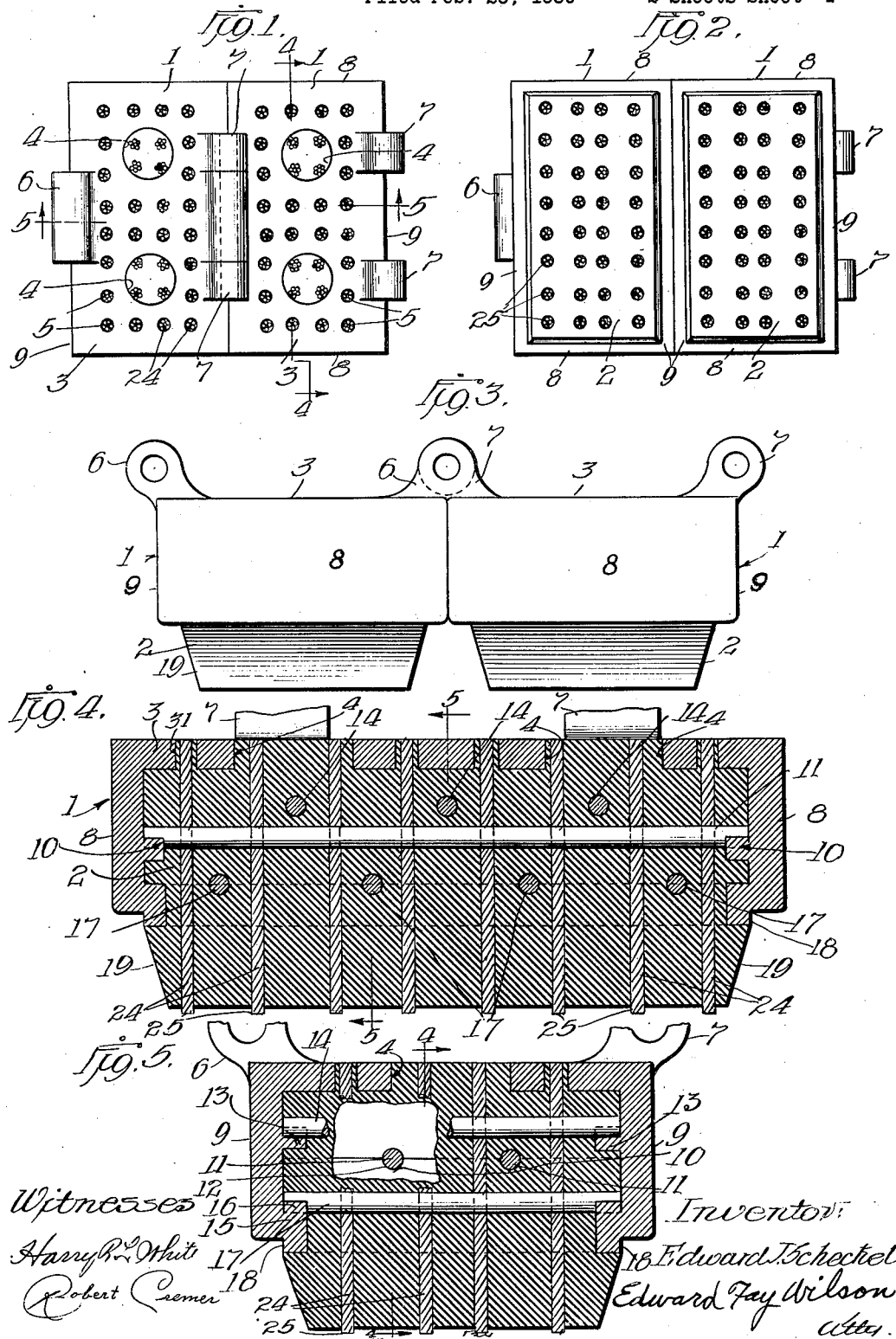

Nov. 8, 1932.  E. J. SCHECKEL  1,886,839
PADDED LINK FOR ENDLESS TRACTOR CHAINS
Filed Feb. 26, 1930  2 Sheets-Sheet 2
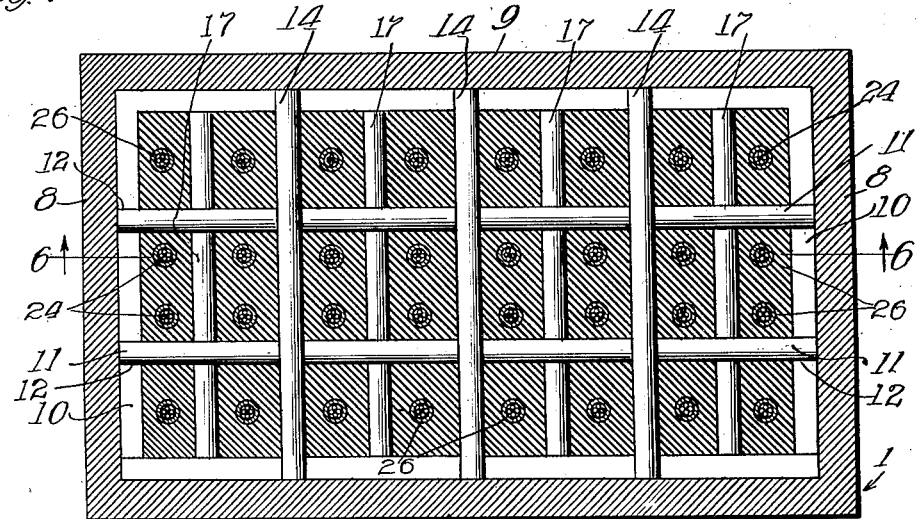
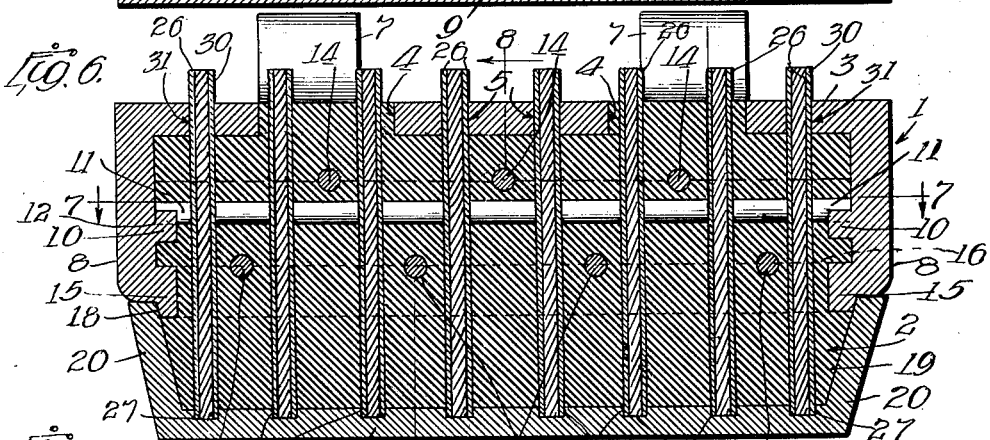
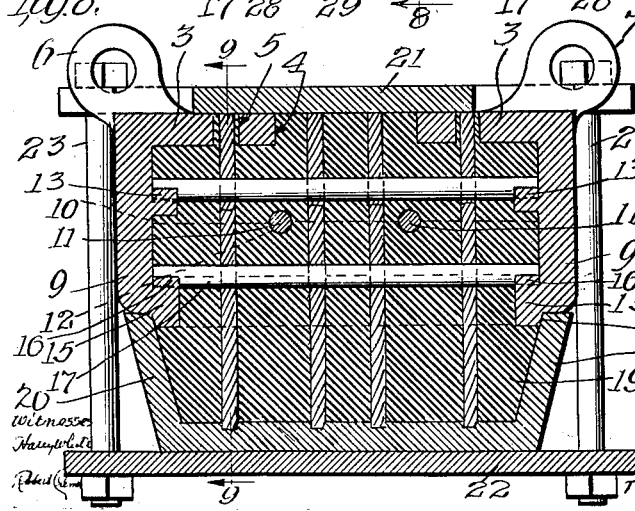
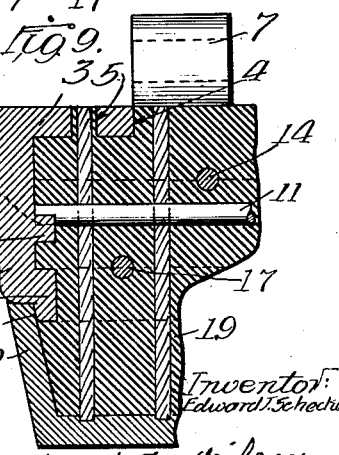
Inventor:
Edward J. Scheckel
By Edward Fay Wilson
Atty Patented Nov. 8, 1932

1,886,839

UNITED STATES PATENT OFFICE

EDWARD J. SCHECKEL, OF BROOKFIELD, ILLINOIS

PADDED LINK FOR ENDLESS TRACTOR CHAINS

Application filed February 26, 1930. Serial No. 431,564.

This invention relates to improvements in padded links for the endless chains of track-laying tractors.

The object of the invention is to provide padded links for the purpose mentioned, so constructed that the pads cannot be loosened from the metal links; to provide a simple method for producing such padded links; to provide pads so constructed that they will not be quickly ground or worn off when the tractor is turned on concrete roads; and generally to improve and cheapen such devices.

A peculiar feature of the invention resides in the means and method used to interlock the rubber pad with the metal link and in vulcanizing the rubber pad in the metal link itself as in a mold.

Another feature of value resides in the novel provision which is made to reduce friction on the pads when the tractor is turned on a hard road such as concrete, and which consists in embedding ropes or cables in the rubber pad in such a manner that end portions thereof are presented to the road bed and assist in preventing the rapid wear of the rubber pad in the turning movements.

The invention will be more readily understood by reference to the accompanying drawings forming part of this specification and in which:—

Fig. 1 is a plan view of the inner faces of a pair of the tractor chain links;

Fig. 2 is a similiar view of the outer faces of a pair of the links;

Fig. 3 is a side elevation of a pair of the links;

Fig. 4 is an enlarged, vertical, longitudinal, sectional view of one of the links on the line 4—4 of Figs. 1 and 5;

Fig. 5 is a vertical, transverse, sectional view on the line 5—5 of Figs. 1 and 4;

Fig. 6 is a sectional view on the line 6—6 of Fig. 7 and similar to Fig. 4 but illustrating the method of making the pad;

Fig. 7 is a horizontal section on the line 7—7 of Fig. 6;

Fig. 8 is a transverse, vertical, sectional view similar to Fig. 5, taken on the line 8—8 of Fig. 6 with the addition of clamping means used during the vulcanizing of the pad; and Fig. 9 is a fragmentary, vertical section on the line 9—9 of Fig. 8.

In said drawings, 1 illustrates one of the metal links which is made in the form of a shallow rectangular box having an open bottom through which the yielding pad 2 projects. The closed top 3 of the link may be provided with two relatively large holes 4 and with numerous smaller holes 5 for purposes to be described.

Each link has a central hinge eye 6 at one end and a pair of hinge eyes 7 at the other end. The eyes on adjacent links are adapted to register and receive hinge pins or bolts by which the links are held in place. These links are adapted to form endless chains which are arranged around the usual tractor wheels for use.

The box-like base is formed of the top 3 and preferably integral end walls 8 and side walls 9. Ledges 10 are provided on the inner faces of the end walls 8, upon which a plurality of metal reinforcing rods 11 are placed. Preferably, the ledges are provided with notches 12 in which the rods fit loosely to hold them in place during the process of packing in the rubber preparatory to the vulcanizing of the rubber pad.

Likewise, ledges 13 are provided on the inner faces of the side walls 9 spaced between the ledges 10 and the top 3 of the link, and a plurality of rods 14 are held on these ledges, these ledges being likewise notched to receive the ends of the rods.

At the open bottom of the box, an inner circumferential rib or projection 15 is provided, which forms a ledge 16 for receiving rods 17 which extend from wall 9 to wall 9, similar to the rods 14 and spaced from the other rods 12. The rib 15 projects out of the open bottom of the link beyond the lower edges of the side and end walls, as shown at 18, providing a circumferential or peripheral shoulder for a purpose to be described.

The yielding pad member 2 comprises a base portion which fills the hollow link and a wearing portion 19 which projects out beyond the edges of the walls of the link.

To produce the pad member 2, a temporary cover part 20 is used, which is in the form of an open-topped box, the side walls fitting over and against the peripheral shoulder 18. The link and the member 20 constitute a mold in which the pad is vulcanized. As shown in Figs. 6, 8 and 9, cover part 20 is placed in position, reinforcing rods 11, 14 and 17 having been placed in position, and then the mold, formed of the link and the cover, is filled with the raw rubber prepared for vulcanizing.

The rubber may be filled in through the large holes 4 in the top wall 3 of the link. But, in any event, the mold is filled with the rubber, care being taken not to displace the reinforcing rods. After the mold has been filled, the holes 4 are closed in any suitable manner, and the cover member 20 is clamped in place by any suitable means, such as the plate 21, for closing the holes 4, the cross-bar 22 and the clamping bolts 23. Then the rubber is vulcanized in the usual manner by heat. After vulcanization, the cover 20 and the clamping means are removed, and the link is ready for use.

To prevent the rapid wearing away of the ground pad, there are provided short pieces of wire cable or rope 24 which project vertically through the body of the pad, as best shown in Fig. 4. These rope pieces may project at the ground surface, as shown at 25, but, of course, such projecting ends would soon wear away or be crushed or forced to spread out against the face of the pad. In any event, such pieces of rope or cable, vulcanized in place, are effective to permit the tractor to turn without tearing the pads to pieces or wearing them too fast.

As a means for placing these pieces of cable or rope in position, tubes 26 are provided, their lower ends 27 being socketed in holes 28 in the bottom 29 of the cover member 20, and their upper ends 30 passing through registering guide openings 31 in the top wall 3 of the link.

When it is desired to fill the mold with the rubber, the reinforcing rods are placed in position; then the tubes 26 are arranged as shown in Fig. 6; then the rubber is packed in. Before the tubes are withdrawn, preparatory to vulcanizing the rubber, the pieces of cable or rope 24 are pushed down within the tubes 26, and then the rope pieces are held from being drawn out, and the tubes 26 are withdrawn. This leaves the rope pieces in position, embedded in the rubber, and the vulcanizing of the pad completes the process.

The ends of the reinforcing rods being arranged beneath the ledges, they cannot possibly be torn out of their places, and the permanent retention of the pad member is assured. The embedded cables or rope pieces not only assist in reducing the friction on turns and thus assist in preventing undue wear on the pads, but they also serve to reinforce the projecting or wearing portion of the pad.

As many modifications of the invention will readily suggest themselves to one skilled in the art, the invention is not limited to the specific details of construction or combinations of parts herein shown and described except within the scope of the appended claims.

I claim:

1. A chain link of the kind described, comprising a box-like body open at its bottom, reinforcing rods within said box arranged in several layers spaced at different heights, the rods of adjacent layers arranged at right angles to each other, means engaging the ends of the rods to prevent their removal, a rubber member vulcanized in place, filling said box and having a ground contact portion projecting out through the open bottom of the box, and flexible reinforcing members arranged within the body of the rubber member and extending vertically therethrough.

2. A chain link of the kind described, comprising a box-like body open at its bottom, inwardly projecting ledges arranged at different heights, reinforcing rods within said box arranged in several layers upon said ledges, each layer arranged in non-parallel relation to the adjoining layer, means engaging the ends of the rods to prevent their temporary displacement, and a rubber member vulcanized in place, filling said box and having a ground contact portion projecting out through the open bottom thereof.

3. A chain link of the kind described, comprising a box-like body open at its bottom, and provided with internal ledges having spaced notches thereon, reinforcing rods arranged on said ledges and in said notches, and a rubber member vulcanized in place, filling said box and projecting from said open bottom.

4. A chain link of the kind described, comprising a box-like body open at its bottom, reinforcing rods arranged in said box in non-parallel relation to each other, means for holding said rods in said relation, and a rubber member vulcanized in place, filling the box and embedding said rods, and projecting from said open bottom, and flexible reinforcing members vulcanized in the rubber member extending at right angles to the layers of reinforcing rods and projecting through the ground contact surface of the rubber member.

In witness that I claim the foregoing as my invention, I affix my signature this 13th day of February, 1930.

EDWARD J. SCHECKEL.